(12) United States Patent
Cairns et al.

(10) Patent No.: US 12,163,696 B2
(45) Date of Patent: *Dec. 10, 2024

(54) METHOD FOR THERMAL PROFILE CONTROL AND ENERGY RECOVERY IN GEOTHERMAL WELLS

(71) Applicant: Eavor Technologies Inc., Calgary (CA)

(72) Inventors: Paul Cairns, Calgary (CA); Matthew Toews, Calgary (CA); John Redfern, Los Angeles, CA (US)

(73) Assignee: Eavor Technologies Inc.

( * ) Notice: Subject to any disclaimer, the term of this patent is extended or adjusted under 35 U.S.C. 154(b) by 0 days.

This patent is subject to a terminal disclaimer.

(21) Appl. No.: 18/501,582

(22) Filed: Nov. 3, 2023

(65) Prior Publication Data

US 2024/0060685 A1 Feb. 22, 2024

Related U.S. Application Data

(63) Continuation of application No. 17/499,415, filed on Oct. 12, 2021, now Pat. No. 11,808,488, which is a
(Continued)

(51) Int. Cl.
*F24T 10/13* (2018.01)
*F03G 7/04* (2006.01)

(52) U.S. Cl.
CPC ............... *F24T 10/13* (2018.05); *F03G 7/04* (2013.01)

(58) Field of Classification Search
CPC ....... F24T 10/13; F24T 2010/56; F24T 10/20; F24T 2201/00; F24T 10/10; F03G 7/04;
(Continued)

(56) References Cited

U.S. PATENT DOCUMENTS 3,817,038 A 6/1974 Paull et al.
4,060,988 A 12/1977 Arnold
(Continued)

FOREIGN PATENT DOCUMENTS

CA 3013374 4/2019
CA 3041002 5/2019
(Continued)

OTHER PUBLICATIONS

Cui et al., "Geothermal Exploitation from hot dry rocks via recycling heat transmission in a horizontal well" Energy, vol. 128, 366-377, 12 pages.
(Continued)

*Primary Examiner* — Hoang M Nguyen
(74) *Attorney, Agent, or Firm* — Fish & Richardson P.C.

(57) ABSTRACT

A method for controlling temperature maxima and minima from the heel to toe in geothermal well lateral sections. The method includes disposing at least a pair of wells proximately where thermal contact is possible. Working fluid is circulated in one well of the pair in one direction and the working fluid of the second well is circulated in as direction opposite. to the first. In this manner temperature equilibration is attainable to mitigate maxima and minima to result in a substantially more uniform temperature of the working fluids in respective wells and the rock formation area there between. Specific operating protocol is disclosed having regard to the temperature control for maximizing thermal energy recovery.

22 Claims, 9 Drawing Sheets

Related U.S. Application Data continuation of application No. 16/524,017, filed on Jul. 27, 2019, now Pat. No. 11,156,386.

(60) Provisional application No. 62/717,849, filed on Aug. 12, 2018.

(58) Field of Classification Search
CPC ....... Y02E 10/10; E21B 43/162; E21B 43/30; E21B 43/305
USPC .............................................. 60/641.2–641.4
See application file for complete search history.

(56) References Cited

U.S. PATENT DOCUMENTS

| | | | |
|---|---|---|---|
| 4,137,720 A | 2/1979 | Rex | |
| 4,538,673 A | 9/1985 | Partin et al. | |
| 5,515,679 A | 5/1996 | Shulman | |
| 5,992,507 A | 11/1999 | Peterson et al. | |
| 6,000,471 A | 12/1999 | Langset | |
| 6,035,949 A | 3/2000 | Altschuler et al. | |
| 6,073,448 A | 6/2000 | Lozada | |
| 6,247,313 B1* | 6/2001 | Moe | E21B 43/305 60/641.5 |
| 6,301,894 B1 | 10/2001 | Halff | |
| 6,668,554 B1 | 12/2003 | Brown | |
| 6,679,326 B2 | 1/2004 | Zakiewicz | |
| 6,708,494 B1 | 3/2004 | Hamann | |
| 7,146,823 B1 | 12/2006 | Wiggs | |
| 7,251,938 B1 | 8/2007 | Bond | |
| 8,020,382 B1* | 9/2011 | Zakiewicz | F03G 7/04 60/641.2 |
| 8,307,896 B2 | 11/2012 | Sarria | |
| 8,381,523 B2 | 2/2013 | Eli et al. | |
| 8,616,000 B2 | 12/2013 | Parella | |
| 8,672,058 B2 | 3/2014 | Tommie, Jr. | |
| 8,708,046 B2* | 4/2014 | Montgomery | F02C 1/05 166/57 |
| 8,991,488 B2 | 3/2015 | Loveday et al. | |
| 9,121,393 B2 | 9/2015 | Schwarck | |
| 9,556,856 B2 | 1/2017 | Stewart et al. | |
| 9,845,423 B2 | 12/2017 | Franzt et al. | |
| 10,527,026 B2* | 1/2020 | Muir | F24T 10/10 |
| 11,125,472 B2 | 9/2021 | Price et al. | |
| 11,156,386 B2* | 10/2021 | Cairns | F24T 10/13 |
| 11,242,726 B2 | 2/2022 | Toews et al. | |
| 11,808,488 B2* | 11/2023 | Cairns | F24T 10/20 |
| 11,959,356 B2 | 4/2024 | Curits-Smith et al. | |
| 2007/0223999 A1* | 9/2007 | Curlett | F24T 10/20 405/55 |
| 2007/0245729 A1 | 10/2007 | Mickelson | |
| 2009/0039108 A1 | 2/2009 | Cohen-Zada | |
| 2010/0276115 A1 | 11/2010 | Parella | |
| 2011/0048005 A1 | 3/2011 | McHargue | |
| 2011/0061382 A1 | 3/2011 | Stern | |
| 2011/0067869 A1 | 3/2011 | Bour et al. | |
| 2011/0224942 A1 | 9/2011 | Kidwell | |
| 2011/0247816 A1 | 10/2011 | Carter, Jr. | |
| 2012/0080163 A1 | 4/2012 | Hoffman | |
| 2012/0174581 A1* | 7/2012 | Vaughan | F24T 10/10 290/40 C |
| 2013/0255258 A1 | 10/2013 | Loveday | |
| 2013/0299036 A1 | 11/2013 | Loveday | |
| 2013/0338835 A1 | 12/2013 | Pepe | |
| 2014/0133519 A1 | 5/2014 | Freitag et al. | |
| 2014/0326668 A1 | 11/2014 | Loveday | |
| 2015/0198019 A1 | 7/2015 | Affholter et al. | |
| 2016/0040518 A1 | 2/2016 | Potapenko et al. | |
| 2016/0245550 A1 | 8/2016 | Sonju et al. | |
| 2017/0130703 A1 | 5/2017 | Muir et al. | |
| 2017/0211849 A1 | 7/2017 | Muir et al. | |
| 2018/0274524 A1 | 9/2018 | Moncarz et al. | |
| 2018/0291880 A1 | 10/2018 | Cairns et al. | |
| 2019/0128567 A1 | 5/2019 | Redfern | |
| 2019/0154010 A1 | 5/2019 | Toews | |
| 2019/0346181 A1 | 11/2019 | Price et al. | |
| 2020/0011151 A1 | 1/2020 | Curtis-Smith et al. | |
| 2022/0372838 A1 | 11/2022 | Curtis-Smith et al. | |

FOREIGN PATENT DOCUMENTS

| | | |
|---|---|---|
| CA | 3038294 | 6/2019 |
| CN | 101027480 | 8/2007 |
| CN | 201593889 | 9/2010 |
| CN | 108291437 | 7/2018 |
| GB | 2518442 | 3/2015 |
| KR | 10-2009-0054856 | 6/2009 |
| KR | 101403687 | 6/2014 |
| RU | 2064141 | 7/1996 |
| WO | WO 1998022760 | 5/1998 |
| WO | WO 2012068279 | 5/2012 |
| WO | WO 2014081911 | 5/2014 |
| WO | WO 2014182732 | 11/2014 |
| WO | WO 2015030601 | 3/2015 |
| WO | WO 2015134974 | 9/2015 |
| WO | WO 2015192011 | 12/2015 |
| WO | WO 2016091969 | 6/2016 |
| WO | WO 2017009652 | 1/2017 |
| WO | WO 2017053884 | 3/2017 |
| WO | WO 2017146712 | 8/2017 |
| WO | WO 2019157341 | 8/2019 |

OTHER PUBLICATIONS

Energy.mit.edu [online] "The Future of Geothermal Energy Impact of Enhanced Geothermal Systems (EGS) on the United States in the 21st Century," Nov. 2006, retrieved from URL<https://energy.mit.edu/wp-content/uploads/2006/11/MITEI-The-Future-of-Geothermal-Energy.pdf>, 375 pages.
Esmap.org [online] "Geothermal handbook: Planning and Financing Power Generation," 2012, retrieved from URL<https://www.esmap,org/sites/esmap.orq/files/ Documentlibrary/FINAL_Geothermal%20Handbook_TR002-12_Reduced.pdf>, 164 pages.
Examination Report in Australian Application No. 2019208168, dated Mar. 18, 2020, 4 pages.
Examination Report in Australian Application No. 2019208168, dated Nov. 2, 2020, 6 pages.
Examination Report in Singapore Appln. No. 11202005044R, dated Jan. 2, 2021, 3 pages.
Gulf Cooperation Council Examination Report in GCC Appln. No. GC 2019-38099, dated Apr. 15, 2021, 5 pages.
Gulf Cooperation Council Examination Report in GCC Appln. No. GC 2019-38099, dated Sep. 2, 2020, 4 pages.
International Preliminary Report on Patentability in International Appln. No. PCT/CA2019/000111, mailed on Feb. 16, 2021, 5 pages.
International Search Report and Written Opinion in International Appln. No. PCT/CA2019/000111, dated Oct. 10, 2019, 7 pages.
Lunis et al., "Geothermal Direct Use Engineering and Design Guidebook," United States Department of Energy, 1991, 152.
Noorollahi et al., "Three dimensional modeling of heat extraction from abandoned oil well for application in sugarcane industry in Ahvaz—Southern Iran." Proceedings of the World Geothermal Congress, Apr. 2015, 11 pages.
Office Action in African Regional Appln. No. 2020/012565, dated Sep. 6, 2022, 6 pages.
Office Action in Argentina Appln. No. 20190102234, dated Sep. 29, 2022, 4 pages.
Office Action in Australian Appln. No. 2021203166, dated Sep. 28, 2022, 4 pages.
Office Action in Chinese Appln. No. 201910728135.2, dated Jul. 14, 2021, 27 pages (With English Translation).
Office Action in Chinese Appln. No. 201910728135.2, dated Nov. 24, 2021, 17 pages (With English Translation).
Office Action in Chinese Appln. No. 201910728135.2, dated Oct. 16, 2020, 21 pages (With English Translation).
Office Action in Eurasian Appln. No. 202190529, dated Apr. 13, 2021, 5 pages (With English Translation).
Office Action in European Appln. No. 19188962.5, mailed on Jan. 29, 2024, 5 pages.

(56) References Cited

OTHER PUBLICATIONS

Office Action in European Appln. No. 19188962.5, mailed on Jun. 27, 2023, 13 pages.
Office Action in Korean Appln. No. 1020207018946, dated Aug. 12, 2022, 15 pages (With English Translation).
Office Action in Mexico Appln. No. 2019/009389, dated Nov. 11, 2022, 3 pages.
Office Action in Mexico Appln. No. 2019009389, mailed on Mar. 15, 2023, 10 pages (with Machine translation).
Office Action in U.S. Appl. No. 17/499,415, dated Oct. 7, 2022, 24 pages.
Templeton et al., "Abandoned Oil/Gas Wells as Sustainable Sources of Renewable Energy." Proc. 23rd World Mining Congress, 2013, 10 pages.

\* cited by examiner

Target formation temperature distribution map with isotherms

METHOD FOR THERMAL PROFILE CONTROL AND ENERGY RECOVERY IN GEOTHERMAL WELLS

CROSS-REFERENCE TO RELATED APPLICATIONS

This application is a continuation of and claims the benefit of priority to U.S. patent application Ser. No. 17/499,415, now issued as U.S. Pat. No. 11,808,488 on Nov. 7, 2023, which is a continuation of U.S. patent application Ser. No. 16/524,017, now issued as U.S. Pat. No. 11,156,386 on Oct. 26, 2021, which claims the benefit of U.S. Provisional Application No. 62/717,849, filed Aug. 12, 2018, the contents of which are incorporated by reference herein.

TECHNICAL FIELD

The present invention relates to thermal control of absorbed thermal energy in wells and more, particularly, the present invention relates to control of temperature dissipation and efficient energy recovery in geothermal wells, and optimization of the design and operation of closed-loop geothermal wellbore systems.

BACKGROUND ART

Currently, the United States is a global leader in installed geothermal capacity having more than 3,300 megawatts in eight states. The majority of this is located in California.

As is known, in geothermal energy heat is continually generated within the magma layer through radioactive decay. It has been reported that the amount of heat within 10,000 meters of Earth's surface contains 50,000 times more energy than all the oil and natural gas resources in the world. Clearly, this is a point of interest within the energy developer community.

At these depths, issues were previously reported concerning the high temperatures damaging equipment. These have been, in some cases, mitigated or have become satisfactorily tolerable.

One of the key points in geothermal energy production is managing the thermal losses within the well and thus the ability to mine the heat with the working fluid used as the capture and transport medium.

The prior art has developed in this area as evinced by the documents set forth.

Shulman, in U.S. Pat. No. 5,515,679, issued May 14, 1996, provides a method for geothermal heat mining and utilization of the recovered energy. A manifold arrangement receives a network of wells dispersed within a formation. Various formations or arrays of the wells are provided, with the wells being dispersed within each specific well formation. The document is silent in respect of the thermal dissipation over the length of the wells.

In U.S. Pat. No. 9,556,856, issued Jan. 31, 2017, Stewart et al., provide a geothermal energy system and method of operation. In the disclosure in referring to FIG. 15, the patentees state:

"The inner tubing 304 is centralised in the outer casing 302 by means of centraliser fins 318 which are located at intervals along the tubing 304 and is left "open-ended" a short distance above the bottom plug 314 so as to establish an efficient, closed-loop path for the circulation of the working fluid (water-based) that acts as the thermal energy transfer medium. These fins 318 also act as mechanical "turbulators" that induce flow characteristics in the borehole heat exchanger annulus 320 between the outer casing 302 and inner tubing 304 that moderately enhance the transfer of geothermal energy to or from the ground formations while minimising pressure losses. Typically, the working fluid is pumped down the annulus 320 (arrow A) and back up the inner tubing 304 (arrow B) to surface under the control of the surface control module although, based upon the precise application, the circulation direction may be reversed in some cases to provide optimum performance."

This passage teaches a working fluid flow reversal within a single well, but does not address any mechanism for controlling the thermal issues within the formation where heat mining is being conducted.

Guodong et al., in *Geothermal exploitation from hot dry rocks via recycling heat transmission in a horizontal well*, Energy 128 (2017) p 366-377, conclude that heat exchange is enhanced between the hot surrounding rock formation through long horizontal segments of a closed loop well using specific working fluids, an increase in the horizontal well length and fluid injection rate in thermally insulted tubing increase the heat mining rate and that there are benefits to using multi branch horizontal segments.

Collectively, the teachings in the prior art are useful, but do not address issues such as: the large footprint inherent with multiple branched horizontal wells, well disposition and configuration within a given rock formation volume for enhanced heat mining or temperature maxima and minima along the well length.

Recognizing these shortcomings, the instant technology set forth herein advances geothermal technology one step further and combines determinant unit operations in a unique manner to efficiently recover thermal energy within a geothermal gradient regardless of gradient quality and variation, formation porosity, ambient conditions, geographic location, inter alia.

In the parallel prior art from the oil and gas industry, drilling techniques for multilateral wells, specific drilling fluids, etc. are well established, however simple transference to geothermal exploration and recovery is not realistic or feasible; geothermal energy recovery present its own complications. A number of factors must be considered in order to synthesize a viable recovery protocol. This requires the ability to dynamically adjust thermodynamic parameters during energy recovery, mitigate any well integrity or performance issues, reverse, reroute or stop working fluid flow, change working fluid composition among others. Unification in the proper sequence requires analysis predicated on a vast appreciation of a number of technologies; absent this, the solution becomes labyrinthine.

This is evinced in the myriad of geothermal prior art which has struggled with drilling issues, working fluid formulations, complex heat exchanger arrangements with both down hole and surface positioning, gradient quality and location, continuous and discontinuous loops, wellbore casings and variations thereto.

Owing to the landscape of the geothermal prior art, a technique which navigates through the noted complications to circumvent them for a universal solution, would be beneficial.

The present invention provides effective solutions to the current limitations to the degree that geothermal energy production can economically become a premier energy production method.

DISCLOSURE OF THE INVENTION

One object of the present invention is to provide control of the temperature profile in rock surrounding geothermal wells.

A further object of one embodiment of the present invention is to provide a method for maximizing geothermal energy recovery within a formation having a geothermal gradient, comprising:

determining the geothermal gradient within the rock volume of said formation;

forming a wellbore configuration for location and positioning within said rock volume with the configuration of the wellbore based on a determined geothermal gradient for maximum thermal recovery, the wellbore configuration comprising a closed loop having an inlet well and outlet well and lateral interconnecting section in fluid communication, said lateral section of said configuration positioned within said rock volume;

selecting at least one working fluid for circulation in a predetermined sequence within said configuration based on:

wellbore configuration;

geothermal gradient variation; and formation geology;

determining working fluid temperature from sequenced circulation within said wellbore configuration; and selecting at least one of:

working fluid rerouting and distribution within said configuration;

working fluid composition;

working fluid flow rate within said configuration;

working fluid flow direction; and combinations thereof to maximize energy recovery with said working fluid from said rock volume.

Heat transfer from the rock is inversely proportional to the working fluid temperature within the wellbore. The heat transfer maxima occurs at the "heel" of the inlet well where the temperature of the working fluid within the well is at a minimum. The working fluid heats up as it traverses the horizontal section of the well towards the "toe" of the well. This is evinced by the thermal profile data. The heat transfer profile is observed generally as a tapering from the heel to toe with the minima at the outlet well.

It has been found that various configurations of combined wells have a beneficial effect on the profile, allowing higher heat extraction from a given volume of rock and reducing well construction costs and "dead spots" where heat extraction is inefficient.

Interdigital disposition or meshing of horizontal sections of proximate wells has been found to compensate for temperature maxima and minima in wells. The effect is realized with proximity sufficient for thermal contact between wells. With working fluid flow in opposition between proximate wells a temperature equilibrium can be induced in the geothermal formation such that the maxima of one well offsets or mitigates the minima of a proximate well.

To further enhance the extraction of thermal energy from within the formation the wellbore configuration network may be formed by sealing the wellbore during drilling absent casing in lateral sections of wellbores. This obviously has a pronounced cost benefit together with advantageous thermodynamics. This contributes to the universal applicability of the protocol; the configuration can be utilized in any one of a high temperature gradient, low temperature gradient, conductive zone within the gradient, convective zone within the gradient, high permeability zone within the formation, low permeability zone within the formation and combinations thereof.

The sealing composition may also include materials to enhance the thermal conductivity of the seal. Suitable compositions may be seen in the known art typically by Halliburton, Baker Hughes and others.

Further, the working fluid composition may include additives to maintain wellbore integrity in the configuration and fluid density for compressive strength of the wellbores in the configuration.

Ancillary mechanical or chemical unit operations and combinations thereof may be included to maintain wellbore integrity. This may comprise use of chemical sealants and densifying agents introduced into the wellbore configuration at predetermined locations in at least one of a single operation and sequentially phased operations, depending on requirements.

In respect of mechanical operations, casing/multilateral junctions may be incorporated on predetermined locations as required.

Drag reducing agents or other additives may be added to the working fluid to improve thermodynamic performance, reduce or eliminate parasitic pump load, and enable larger wellbore networks to be drilled while maintaining optimum hydraulic performance.

Further, the method facilitates providing sufficient hydraulic frictional pressure losses in each lateral section to passively control flow distribution within lateral sections within said configuration.

In respect of the wellbore configurations, the same may be spaced, angled, stacked, conglomerated, interdigitated and interconnected and combinations thereof individual within the rock volume to maximize energy extraction. Orientation will also mitigate any thermal interference or "dead spots" as well as the potential need for thermal recharge of individual wellbores that may require inactivity with quiescent working fluid flow for a predetermined time frame.

Inlet wells and outlet wells of the configurations may be common to at least some of the proximate wellbore configurations. Single or multiple sites are also contemplated. Further to this the closed loops of the wellbore configurations may be above or below the surface site. This will depend on specifics of the individual situation.

Having thus generally described the invention, reference will now be made to the accompanying drawings.

BEST MODE FOR CARRYING OUT THE INVENTION

Figure 1:
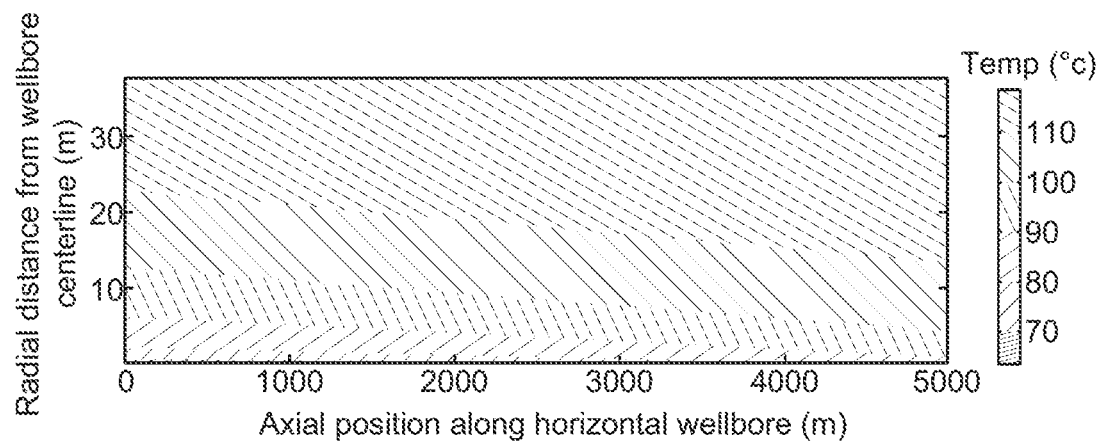
FIG. 1 is a temperature profile illustrating temperature at the radial distance from the wellbore centreline relative to the axial position along the horizontal wellbore.

Referring now to FIG. 1, shown is a thermal illustration depicting the temperature tapering along the axial position of the horizontal well for a given surrounding rock volume. Noteworthy is the fact that there is a heating of the working fluid from the heel of the well to the toe. Heat transfer from the rock is inversely proportional to this working fluid temperature. Accordingly, most of the heat energy is captured at a maximum of the heel and a minimum of the toe. This obviously has efficiency limitations, since maxima and minima are created.

Figure 2:
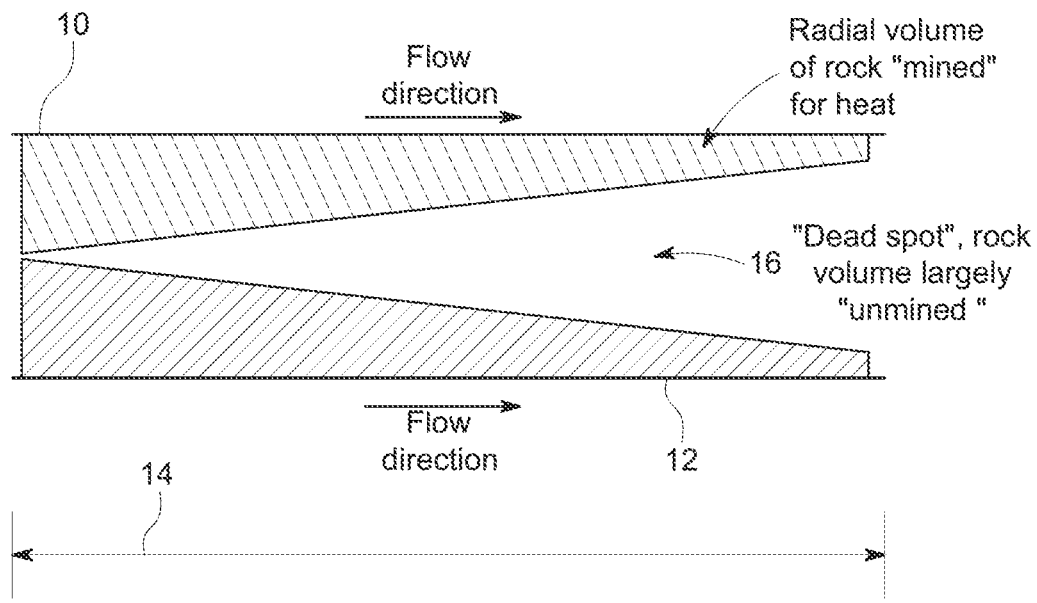
FIG. 2 is a thermal illustration of the radial volume of rock mined for heat for a pair of spaced apart horizontal wellbores.

Referring now to FIG. 2, shown is a plan view of two spaced apart horizontal wellbores 10 and 12 disposed within a geothermal formation 14. The wells 10 and 12 are spaced apart but remain in thermal contact. Each wellbore 10 and 12, in this example, has a working fluid flow in the same direction as identified in the Figure. The thermal profile, as discussed with reference to FIG. 1 is depicted for each wellbore 10 and 12, with the profiles diverging from one another thus leaving the area 16, a "dead spot" from which no heat energy is extracted in a relevant timeframe.

Figure 3:
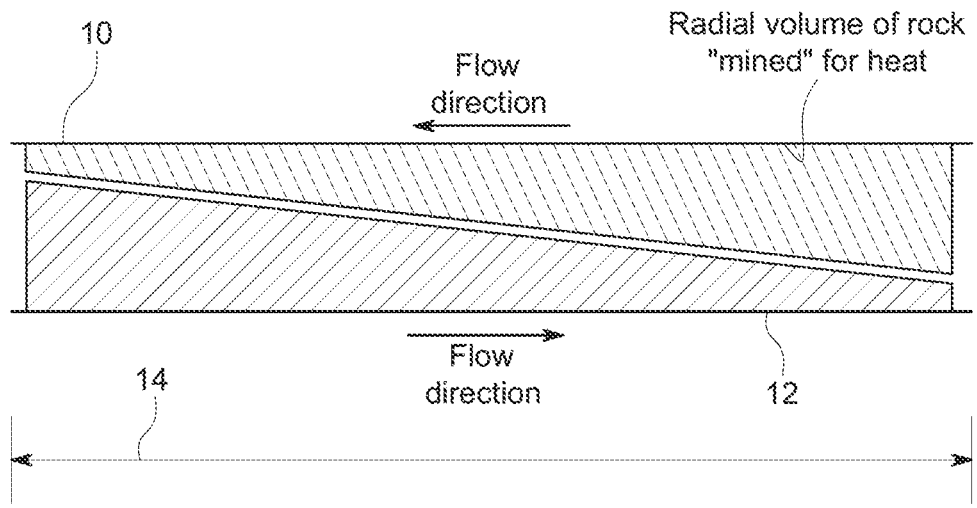
FIG. 3 is a view similar to FIG. 2 where working fluid flow is reversed for a pair of horizontal wellbores.

FIG. 3 illustrates a first solution to the extraction issue raised in respect of FIG. 2. In this Figure, flow direction between horizontal wellbores 10 and 12 is reversed as depicted. In this manner, the temperature maxima and minima are equilibrated for each wellbore 10 and 12 and the rock volume between the two wellbores 10 and 12 has no "dead spot" or "unmined" region, i.e. area 16. As such, for a given volume of rock within which the wellbores 10 and 12 are positioned, a greater radial volume of rock can be mined for heat or in the vernacular, a greater amount of heat can be recovered per unit area. The wellbores are also spaced closer together, providing a significant reduction in well drilling/construction costs.

Figure 4:
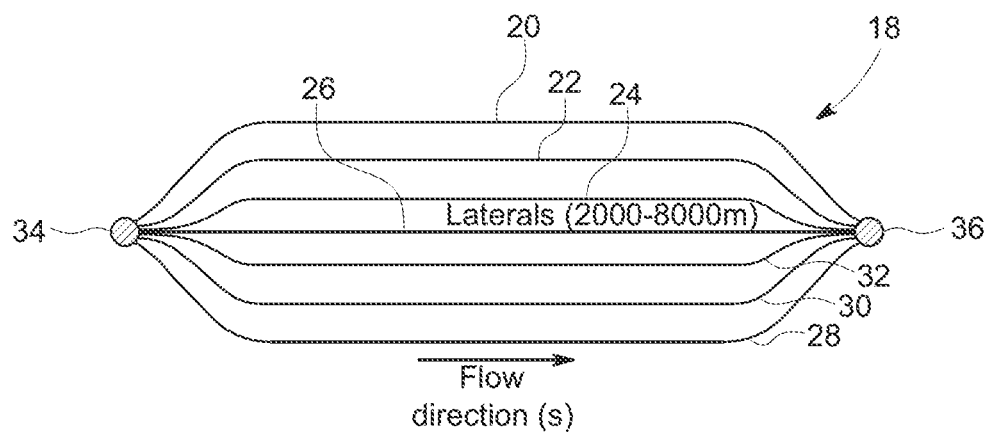
FIG. 4 is a schematic illustration of a well system having a plurality of horizontal wells commonly connected to an inlet well and an outlet well.

FIG. 4 is a schematic illustration of a prior art multiple lateral or horizontal well system, generally denoted by numeral 18. In this embodiment, horizontal wellbores 20 through 32 are in a generally radial spaced apart relation all sharing a common inlet wellbore 36 and outlet wellbore 38. In this embodiment, the horizontal wellbores are, as an example, between 2000 m and 8000 m in length.

Figure 5:
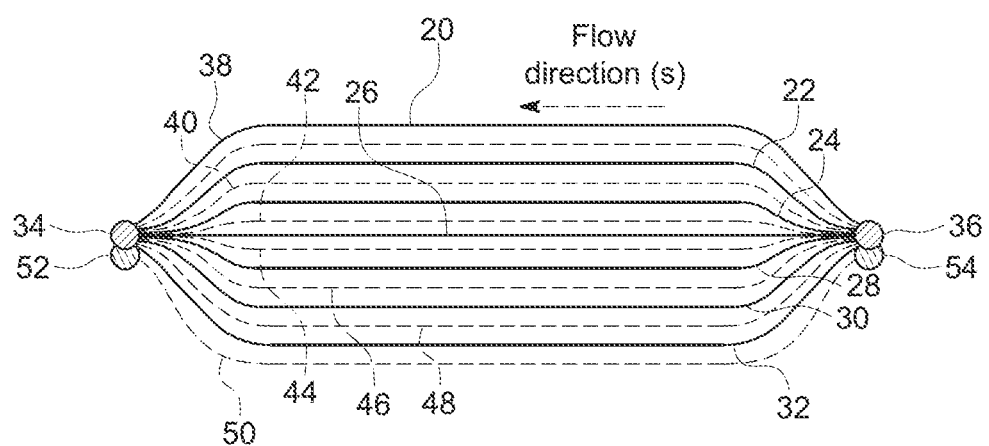
FIG. 5 is a view similar to FIG. 4 illustrating an interdigitated well system according to one embodiment of the present invention.

FIG. 5 illustrates an interdigitated or meshed arrangement of two well systems 18. It has been found owing to the effectiveness of the arrangement discussed in respect of FIG. 3, that disposing the two well systems 18 in spaced apart, thermal contact presents the benefit as outlined regarding FIG. 3. The second well system 18 includes horizontal wellbores 38 though 50 and similar to FIG. 4 have a common inlet wellbore 52 and common outlet wellbore 54. By this arrangement, proximate wellbores, for example, 20, 38; 22, 40; 24, 42, etc. each have opposite working fluid flow direction relative to one another and thus achieve the result as noted with respect to FIG. 3. As will be appreciated, this substantially increases the well density for a given volume of rock within the geothermal formation and therefore the amount of heat energy extracted into the working fluid.

Figure 6:
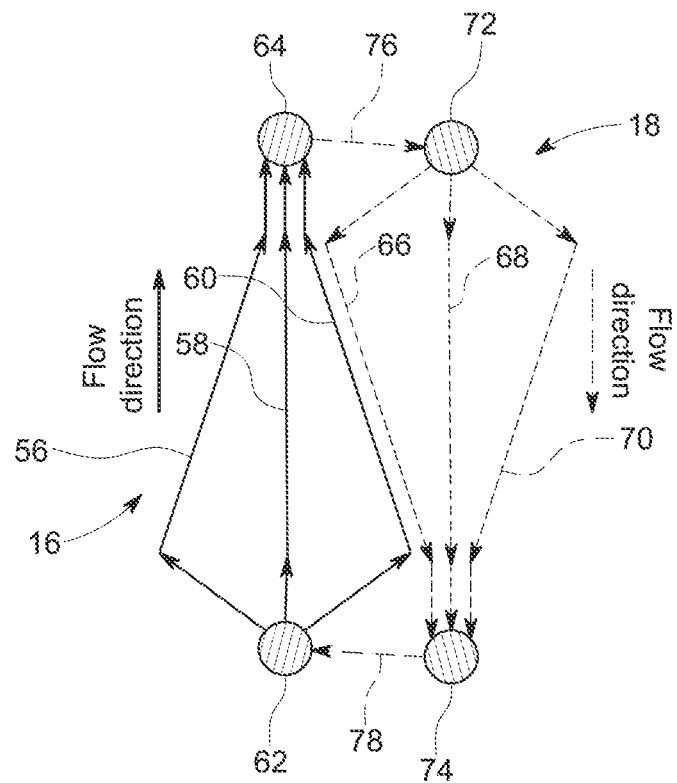
FIG. 6 is a top plan view of an alternate embodiment of the present invention.

Turning now to FIG. 6, shown is an alternate embodiment of the present invention where well systems 18 are arranged side by side in an inverted disposition. In this arrangement, first well system 18 includes multiple wellbores 56, 58 and 60 commonly connected to inlet wellbore 62 and common outlet wellbore 64. From the inlet 62 to the outlet 64, the multiple wellbores 56, 58 and 60 converge and thus spacing there between varies from 62 to 64. Working fluid flow direction is from 62 to 64 as indicated. Working in concert with the multiple wellbores 56, 58 and 60 is a second set of multiple wellbores 66, 68 and 70. The latter share a common inlet 72 and common outlet 74. This arrangement is the same as that for wellbores 56, 58 and 60 with the exception that the convergence is opposite to that of the first well system 18, i.e the fluid flow is from 72 to 74. Further multiple wellbore 66 is space from, but thermally proximate multiple wellbore 60. Each of the well systems 18 is linked at 76 and 78 for fluid exchange there between. As noted, this is an alternate arrangement to mitigate the maxima and minima temperature profile induced in the rock volume.

Figure 7:
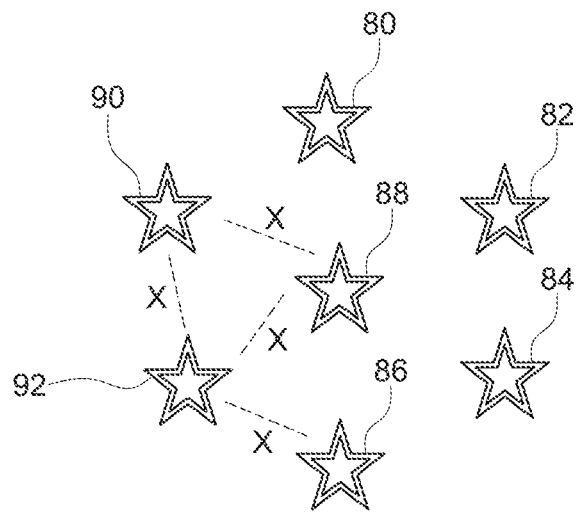
FIG. 7 is a cross section of a well arrangement.
Figure 8:
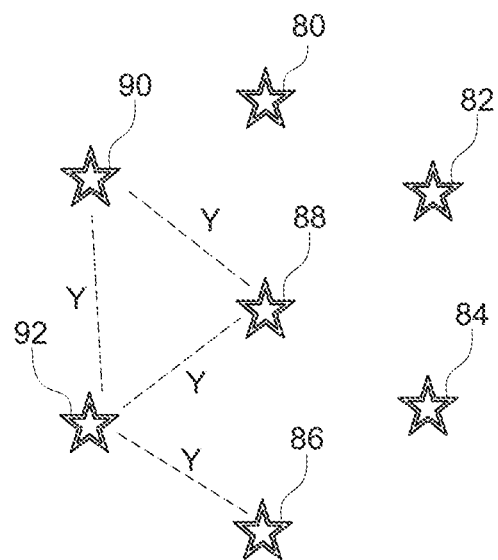
FIG. 8 is a cross section of another well arrangement.

FIG. 7 illustrates a cross section of 7 multiple wellbores at the convergent point discussed in connection with FIG. 6, near the outlet well, where the spacing relationship between the multiple wellbores 82 through 92 is shown to be similar as denoted by distance "X" with an example distance of 20 m to 80 m. The wellbores are coming out of the page. FIG. 8 illustrates a cross section of 7 multiple wellbores 82 through 92 at the divergent point, near the inlet well, with example spacing "Y" which is equidistant between 80 m and 120 m.

This arrangement is an alternative to that discussed regarding FIG. 5, however, it achieves the same thermal benefit owing to the fluid flow direction and thermal proximity of the multiple wellbores.

Figure 9:
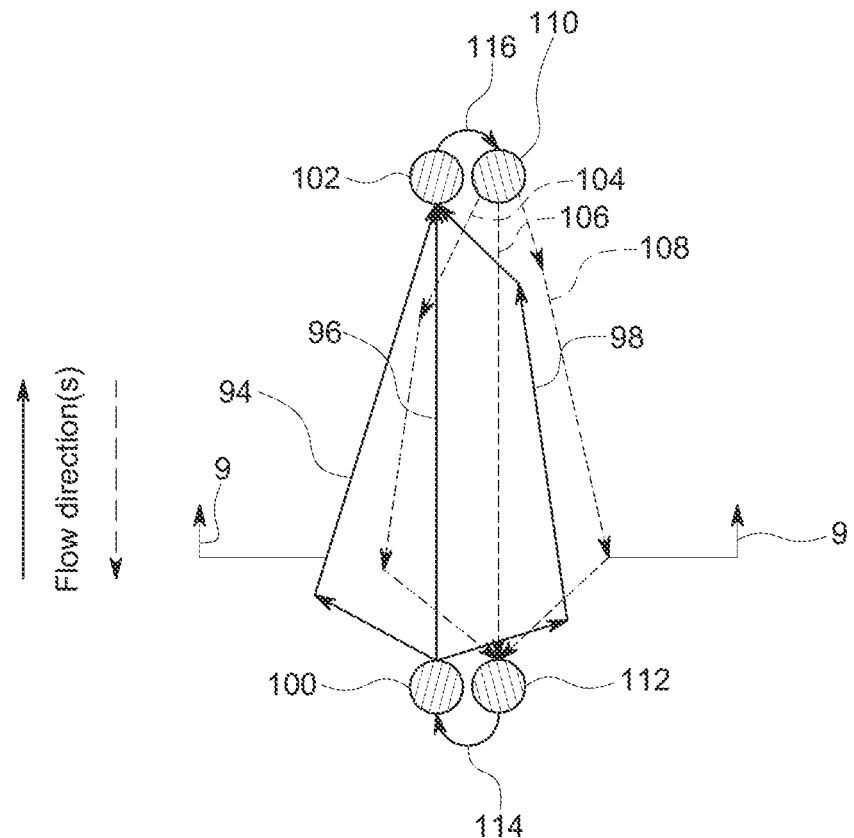
FIG. 9 is a top plan view of an alternate embodiment of the present invention.

With reference to FIG. 9, shown is an alternate embodiment of the arrangement of FIG. 6. In this embodiment, interdigital connection is provided. In this example, multiple wellbores 96, 98 and 100 having a common inlet well 100 and common outlet well 102 and diverging from 100 to 102. Multiple wellbores 96, 98 and 100 are interdigitated with multiple wellbores 104, 106 and 108. The latter share a common wellbore inlet 110 and common wellbore outlet 112. The well pattern diverges from 112 to 110. Spacing relationships are observed as with the previous embodiments to achieve the thermal capture results. Each of the well systems is linked for fluid exchange at 114 and 116.

Figure 10:
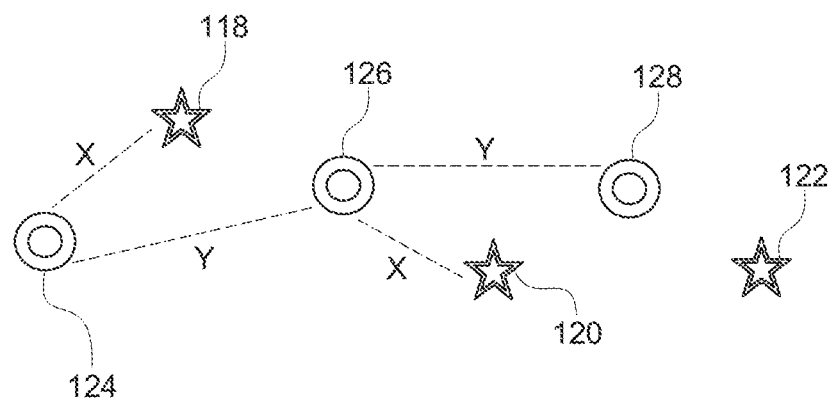
FIG. 10 is a cross section along line 9-9 of FIG. 9.

FIG. 10 is a schematic illustration in cross section of a system of wells 118, 120 and 122 in similar spaced relation and thermal contact with wells 124, 126 and 128. Working fluid flow for 118, 120 and 122 is opposite to that for wells 124, 126 and 128. Intra well spacing is dependent on a number of factors.

Figure 11:
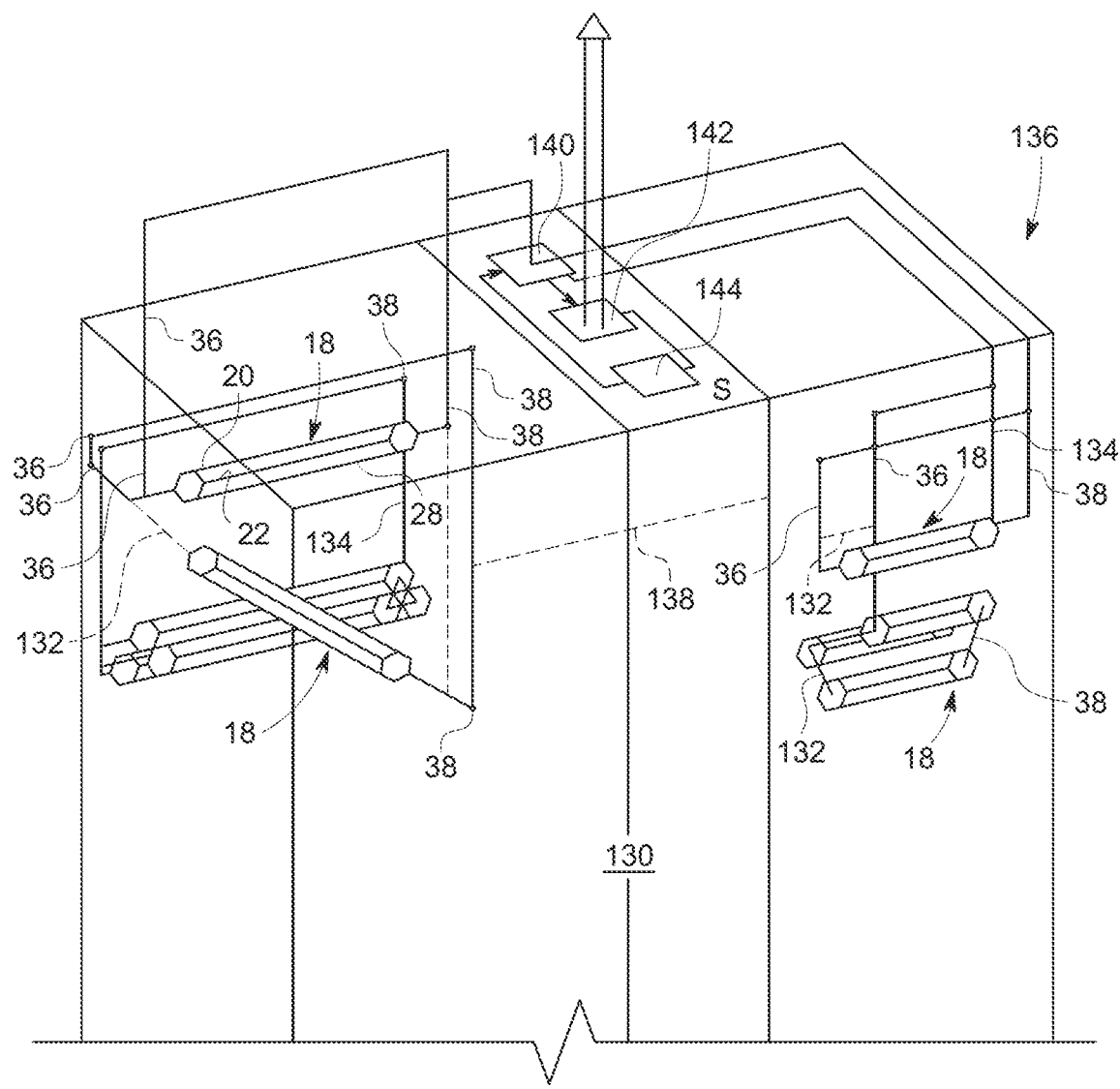
FIG. 11 is a schematic illustration of a wellbore configuration network within a geothermal gradient of a rock formation.

Referring now to FIG. 11, shown is a schematic illustration of a planned wellbore configuration network within a rock formation having a variable geothermal gradient, denoted by numeral 130. As illustrated in the example, the lateral well systems are denoted by numeral 18 as referenced in respect of the earlier described Figures and may subscribe to anyone or combinations of configurations discussed herein previously. The numerical designation is for clarity only.

In respect of the disposition of the well systems, the same may be spaced, angled, stacked, conglomerated, interdigitated, interconnected and combinations thereof within the rock volume to maximize energy extraction. The disposition will be realized once the geothermal gradient is determined, along with the rock thermal conductivity. This flexibility in the methodology is further enhanced by the fact that the drilling of the wellbores can be done while sealing the wellbore absent casing. In some specific scenarios, casing may be used in predetermined locations within the network.

The configuration may include discrete closed loop wellbore configurations having an inlet 36 and outlet 38 and laterals 20 through 32 (shown more clearly in FIG. 3) disposed within the gradient 130 and/or the same may be interconnected with common connection of inlets 36 and outlets 38 between configurations in a network. The common inlet connections being indicated by numeral 132 and common outlets by numeral 134. Further, the outlet common 134 or individual outlets 38 may be networked to adjacent or proximate wellbore configurations referenced by numeral 136. This is denoted by dashed line and numeral 138.

The gradient may comprise a high temperature gradient, low temperature gradient, conductive zone within said gradient, convective zone within said gradient, high permeability zone within the formation, low permeability zone within the formation and combinations thereof.

Figure 12:
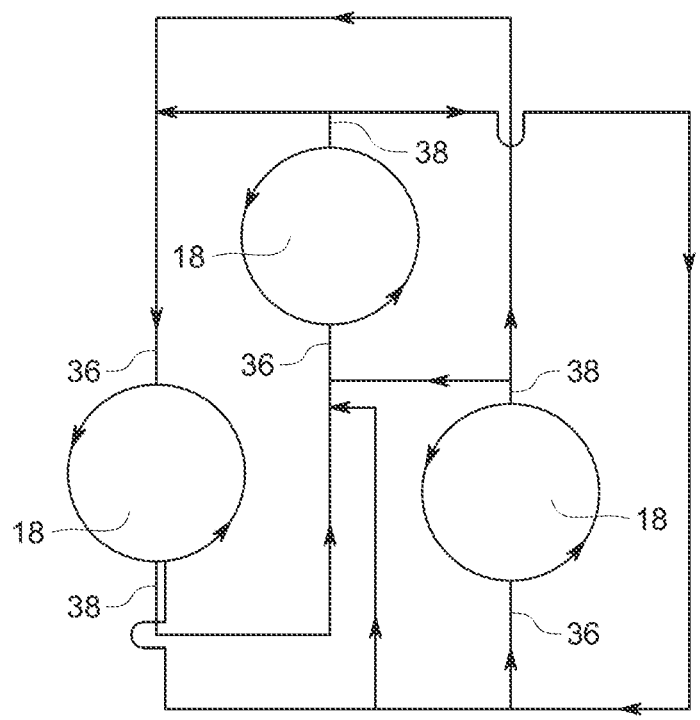
FIG. 12 is a schematic illustration of a circulation sequence within wellbore systems in a configuration network.

FIG. 12 schematically depicts the cross exchange of the working fluid within the network. In this manner, thermal variation or under production is avoided in the network of wells. Accordingly, the working fluid may be rerouted and distributed within the configuration, the working fluid composition changed completely or modified with additives, the fluid flow rate altered, direction altered and combinations thereof to maximize energy recovery with the working fluid from the geothermal gradient. Additionally, working fluid flow may be stopped entirely at a predetermined location within the network depending on performance and/or thermal issues. This procedure also facilitates thermal recharge of a wellbore or system thereof.

Returning to FIG. 11, the closed loop wells 18 may be closed above or below the surface, S, as illustrated. This will depend on the ambient conditions and other variables within the purview of one skilled. Operational control, such as fluid supply, temperature monitoring, fluid sampling, direction, rate inter alia can be done on the surface, S, at 140 using any of the suitable mechanisms and instrumentation well known in the art for achieving the results desired. Recovered thermal energy can be transferred to a suitable energy converter 142 for distribution and/or stored in a storage device 144 for deferred use. Advantageously, the recovered energy may be used to generate steam for use in an industrial process. Depending on specific conditions, the wellbore network may be set up adjacent or proximate an existing industrial project.

Figure 13:
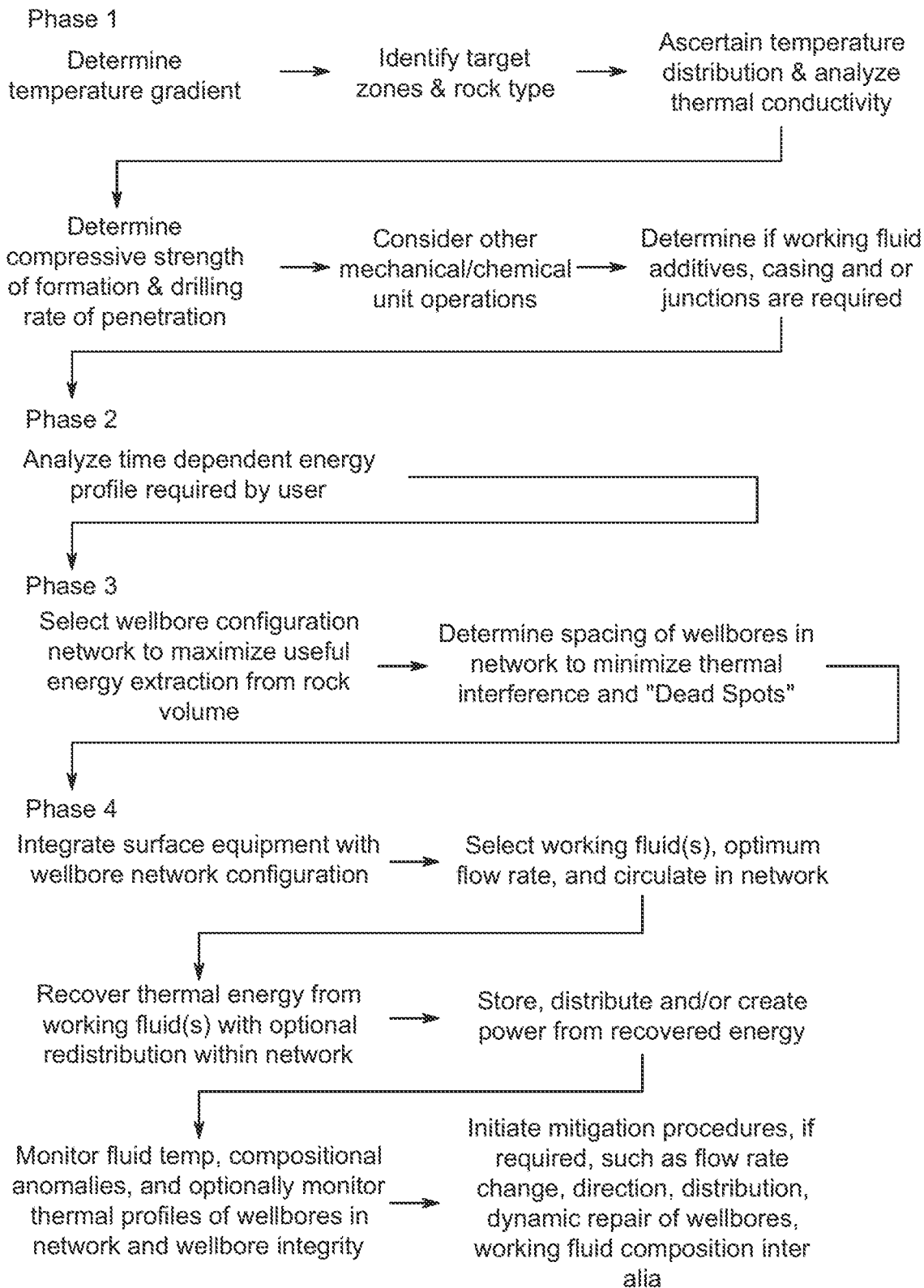
FIG. 13 is a flow chart of events involved in the protocol.

FIG. 13 illustrates the overall protocol with the individual phases delineated. Within phases 2 through 4, the event sequence may vary depending on the ambient conditions, geology, gradient, rock type and variability etc. The intent is to set forth the elegance of the protocol with key operations necessary to maximize thermal recovery regardless of conditions which is a distinguishing feature of the present technology.

Figure 14:
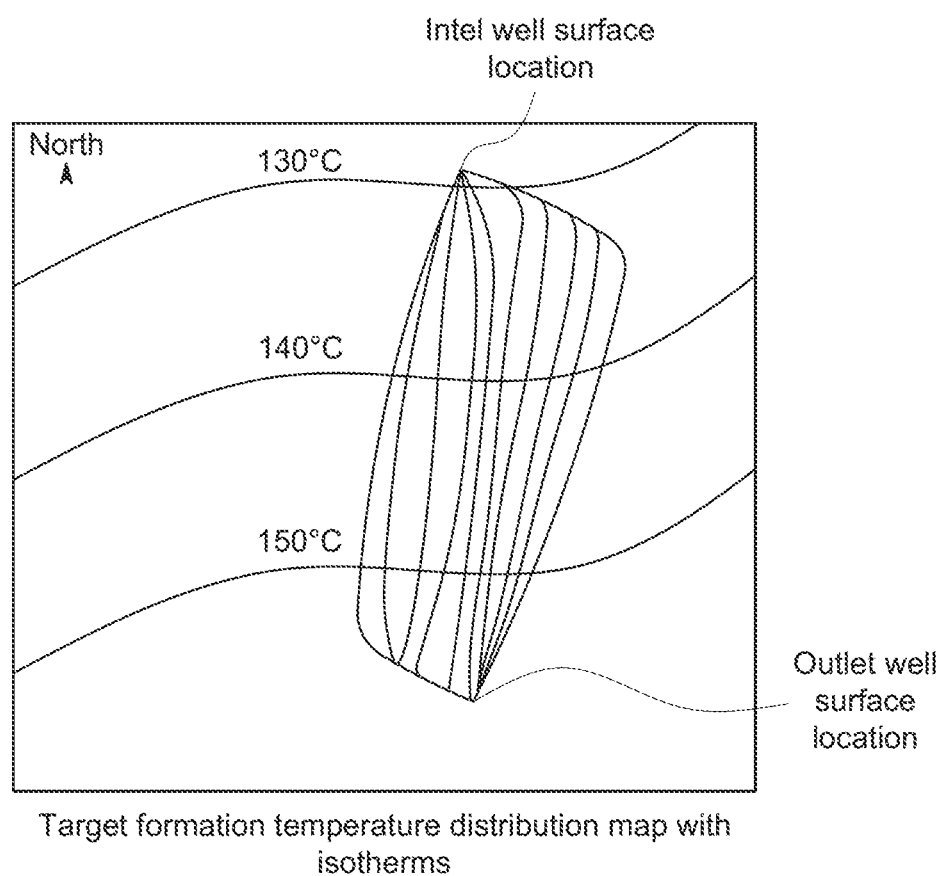
FIG. 14 is a closed-loop wellbore network overlain on a formation temperature distribution map Similar numerals used in the Figures denote similar elements

FIG. 14 illustrates how the previous concepts presented are placed in context of a variable temperature distribution within the target formation, illustrated by the isotherm contours. The optimum wellbore network configuration, spacing among laterals, flow direction, and flow rate varies according to the geothermal gradient and the temperature distribution in the target zone.

Reference will now be made to an example of the protocol.

Generally, the first step in optimizing a closed-loop system is determination of the geothermal temperature gradient in the area. The gradient is typically between 28-35° C./km in sedimentary basins, but can increase up to 50° C. in sedimentary basins with a shallow Currie Point depth (thin crust), and in areas with high heat flow can be up to 150° C./km.

Target zones are identified to place the geothermal wellbores. Unlike traditional geothermal technology, for closed-loop systems any rock is an available zone since no permeability, porosity, or rare geological characteristics are required. Target zones can be sandstone, shale, siltstone, mudstone, dolomite, carbonates, or crystalline basement rock.

Some target zones are preferable due to a combination of temperature distribution, thermal conductivity, and drilling rate of penetration. Therefore, the next step is to use the geothermal gradient to ascertain the temperature distribution of the rock volume as illustrated in FIG. 14, which shows a top-down map of the temperature contours (isotherms) of a given formation. Suitable temperatures can be from 85° C. to 250° C. or as high as 350° C.

Thermal conductivity distribution within the rock volume is estimated. This can be based on direct measurements, extrapolated laboratory data, or calculated from indirect data such as sonic velocity, mineralogy, or rock type. Thermal conductivity ranges from 1.7 W/m K for soft shales to greater than 4 W/m K for quartz rich sandstones.

The next step is to determine the unconfined compressive strength (UCS) of the target zones and then estimate drilling rate of penetration which is a strong function of Unconfined Compressive Strength.

Traditional geothermal technology involves searching for a hydrothermal zone and then optimizing the planning and development of the resource. In contrast, since any geological formation is suitable for closed-loop systems, the target zone selection can be partly based on the optimum drilling rate of penetration. UCS governs rate of penetration and typically ranges from 40 MPa for weak shales to as high as 300 MPa for crystalline basement rocks. The rate of penetration while drilling is generally 5 m/hr for hard rock to over 300 m/hr for soft rock.

All mechanical and chemical unit operations are considered for maintaining wellbore integrity of a closed-loop system. The rock type and unconfined compressive strength will largely dictate the optimum solution. One determines if a sealant and or working fluid additives is sufficient, or if casing and or mechanical junctions are required, or any combination of these.

With the subsurface design inputs largely identified, the next step is to analyse the temperature-dependent energy profile required by the end-user. This can be a profile of thermal energy, cooling power, or electrical power, or a combination. Typically, the profile varies throughout the day and throughout the seasons. Likewise, the ambient conditions of the surface site and time-based pricing can vary throughout the day and season and optionally can be analysed.

The wellbore network configuration in three dimensions is designed to maximize useful energy extraction from the rock volume. Part of this design involves determining the relative spacing between wellbores in the network to minimize thermal interference and "dead spots", or areas of the rock volume where energy is not efficiently extracted. The optimum spacing is a function of temperature distribution in the target zone, thermal conductivity, and working fluid characteristics and flow rate. Drilling costs must also be considered. Spacing is typically from between 20 m and 120 m between wellbores. Spacing between adjacent wellbores in the network can vary along the length of the wellbores to maximize performance, minimize interference, and minimize "dead spots".

The wellbore network configuration is also designed to provide sufficient hydraulic frictional pressure losses in each lateral to passively control flow distribution among the various laterals within the configuration.

Surface equipment should be integrated into the system design, as the outlet from the surface infrastructure is simply the input into the subsurface closed-loop system. Therefore, surface facility equipment design and performance has an impact on subsurface design and performance and vice-versa. As an example, a heat engine with an outlet temperature of 70° C. will have a different optimum subsurface wellbore network design than when coupled to a heat engine with an outlet temperature of 90° C.

The working fluid composition within the wellbore network is determined along with the optimum flow rate over time. The working fluid composition is selected for optimum thermodynamic performance as well as to maintain wellbore integrity. The working fluid may be water, supercritical fluids, hydrocarbons, refrigerants, or any other fluid. Wellbore integrity additives can consist of sealants, reactants, solid particulates, bridging agents, lost circulation material, densifying agents to maintain sufficient compressive strength on the wellbore, or any combination. Drag reducing agents may be added to the working fluid to enable a larger wellbore network configuration without reaching hydraulic limits or impacting overall thermodynamic efficiency.

The working fluid is circulated in the network. Flow rate is typically from between 40 L/s and 200 L/s water equivalent through a network of wellbores in series. If the well network is arranged with parallel well loops or a combination of well loops in series or parallel, the total flow rate is scaled correspondingly.

Thermal energy is recovered from the working fluid circulating through the closed-loop wellbore network. Optionally, flow can be re-distributed within the network to maximize performance.

The recovered energy is distributed, stored, and or converted to electricity. The conversion between various forms of energy and storage may be determined by end-user requirements and/or dynamic pricing.

During operations, one monitors the fluid temperature and compositional anomalies, optionally monitors and/or estimates thermal profiles of wellbores in the network, and optionally monitors and or estimates wellbore integrity of wellbores in the network.

Based on real time monitoring and estimates, operations may be implemented to optimize thermodynamic performance. As examples, these include changes in flow rate, flow direction, and flow distribution among wellbores in the network. For instance, the outlet fluid temperature in one part of the network may be higher than expected, while fluid temperature in another part of the network may be low; flow rates can be adjusted accordingly.

Wellbore integrity can be monitored via measured pressure drops across the wellbore network, measured working fluid volume balance (leak-off or addition of volume), compositional variations, and produced solids volume and characteristics. Dynamic repair of wellbores can be initiated, such as with working fluid additives, reactants, or by circulating fluid slugs containing sealants, bridging agents, or lost circulation material.

It will be appreciated that the unit operations described above can be performed in series, or in parallel in an integrated iterative process, or a combination.

We claim:
1. A method, comprising:
determining a geothermal temperature gradient and thermal conductivity in a specified rock volume;
for a planned closed-loop wellbore configuration comprising a plurality of at least partially uncased lateral wellbores within the specified rock volume, determining a spacing and orientation of a first lateral wellbore of the plurality of lateral wellbores within the specified rock volume relative to a second lateral wellbore of the plurality of lateral wellbores based on an axial temperature variation of a geothermal heat transfer working fluid flowing within the first lateral wellbore relative to an axial temperature variation of the geothermal heat transfer working fluid flowing in the second lateral wellbore along at least a portion of the lengths of the first and second lateral wellbores; and
drilling the plurality of lateral wellbores within the specified rock volume in accordance with the determined spacing and orientation.

2. The method of claim 1, further comprising circulating a sealant in the lateral wellbores to seal the lateral wellbores against communication of fluid with the specified rock volume.

3. The method of claim 1, wherein the first lateral well and the second lateral well are in fluid communication.

4. The method of claim 1, wherein the determined spacing and orientation comprises varying the spacing between the first lateral wellbore and the second lateral wellbore along their lengths.

5. The method of claim 1, wherein the determined spacing and orientation comprises the first lateral wellbore and the second lateral wellbore configured to direct flow of working fluid in a first direction within the first lateral wellbore and in a second direction opposite the first direction within the second wellbore.

6. The method of claim 1, wherein the determined spacing and orientation comprises the first lateral wellbore and the second lateral wellbore substantially horizontal along at least a portion of their length.

7. The method of claim 1, wherein the determined spacing and orientation comprises the first lateral wellbore and the second lateral wellbore substantially parallel with each other along at least a portion of their length within the specified rock volume.

8. The method of claim 7, wherein the portion of their length is a first portion of their length within the specified rock volume and wherein the determined spacing and orientation comprises the first lateral wellbore and the second lateral wellbore converging towards each other along at least a second portion of their length within the specified rock volume.

9. The method of claim 1, wherein the determined spacing and orientation comprises the first lateral wellbore and the second lateral wellbore connecting at their toes.

10. The method of claim 1, wherein the determined spacing and orientation comprises the first lateral wellbore and the second lateral wellbore diverging from each other from an inlet well extending from a terranean surface to the specified rock volume and converging to each other to an outlet well extending from the specified rock volume to the terranean surface.

11. The method of claim 1, wherein at least one of the axial temperature variation of a geothermal heat transfer working fluid flowing within the first lateral wellbore or the axial temperature variation of a geothermal heat transfer working fluid flowing within the second lateral wellbore comprises a tapering axial temperature variation.

12. The method of claim 1, wherein the determining is further based on a determined geothermal gradient within the specified rock volume.

13. A geothermal well system comprising:
an at least partially uncased first lateral wellbore of a plurality of lateral wellbores within a specified rock volume;
an at least partially uncased second lateral wellbore of the plurality of lateral wellbores within the specified rock volume;
the first and second lateral wellbores spaced and oriented alongside each other with respect to one another based on an axial temperature variation of a geothermal heat transfer working fluid flowing within the first lateral wellbore tapering relative to an axial temperature variation of the geothermal heat transfer working fluid flowing in the second lateral wellbore along at least a portion of the respective lengths of the first lateral wellbore and the second lateral wellbore.

14. The system of claim 13, wherein the first lateral wellbore and the second lateral wellbore are sealed against communication of fluid with the specified rock volume absent casing.

15. The system of claim 13, wherein the first lateral well and the second lateral well are in fluid communication.

16. The system of claim 13, the spacing between the first lateral wellbore and the second lateral wellbore varies along their lengths.

17. The system of claim 13, wherein the first lateral wellbore and the second lateral wellbore are configured to direct flow of working fluid in a first direction within the first lateral wellbore and in a second direction opposite the first direction within the second wellbore.

18. The system of claim 13, wherein the first lateral wellbore and the second lateral wellbore connect at their toes.

19. The system of claim 13, wherein the first lateral wellbore and the second lateral wellbore are substantially horizontal along at least a portion of their length.

20. The system of claim 13, wherein the first lateral wellbore and the second lateral wellbore are substantially parallel with each other along at least a portion of their length within the specified rock volume.

21. The system of claim 20, wherein the portion of their length is a first portion of their length within the specified rock volume and wherein the first lateral wellbore and the second lateral wellbore converge towards each other along at least a second portion of their length within the specified rock volume.

22. The system of claim 13, wherein the first lateral wellbore and the second lateral wellbore diverge from each other from an inlet well extending from a terranean surface to the specified rock volume and converge to each other to an outlet well extending from the specified rock volume to the terranean surface.

* * * * *